Aug. 20, 1968  H. SIEBERT  3,397,577
APPARATUS FOR INDICATING THE FILLED STATE IN LIQUID
GAS CYLINDERS
Filed Sept. 8, 1965  3 Sheets-Sheet 1

INVENTOR
Hans Siebert
by Michael J. Striker

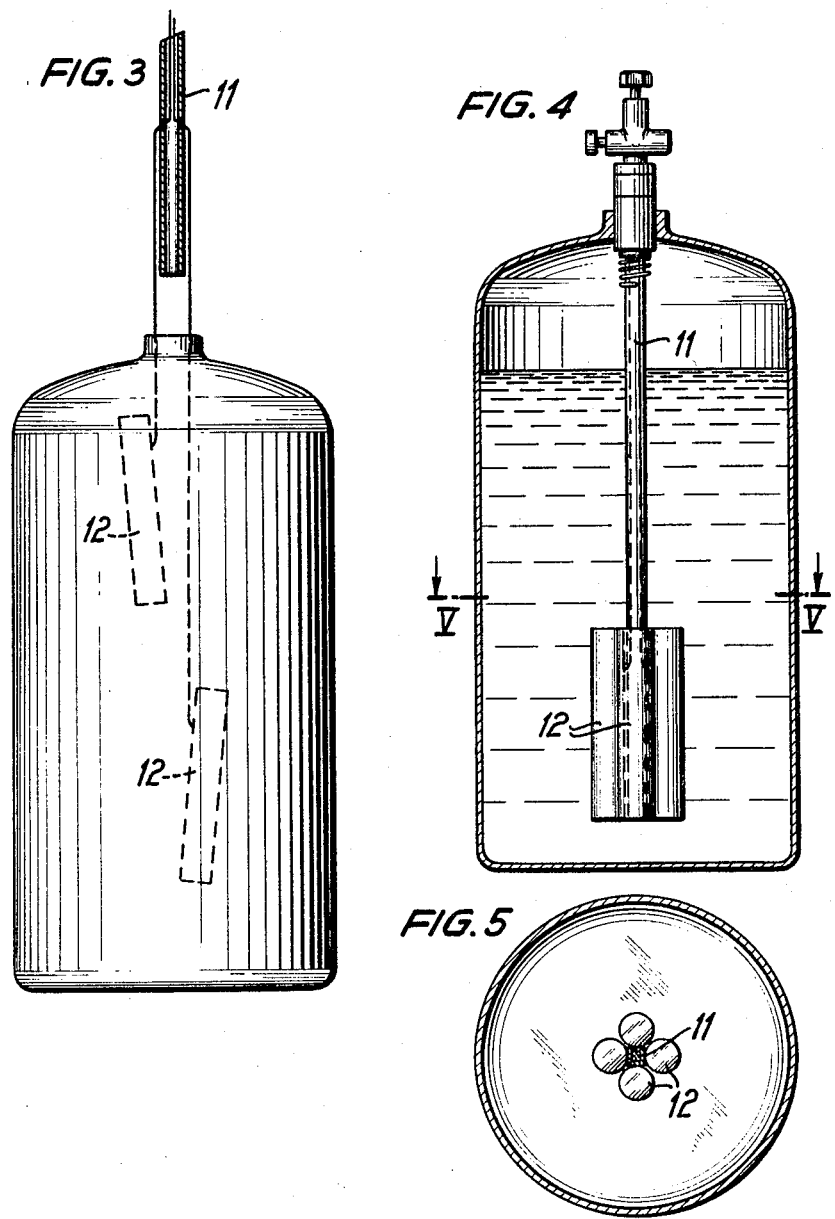

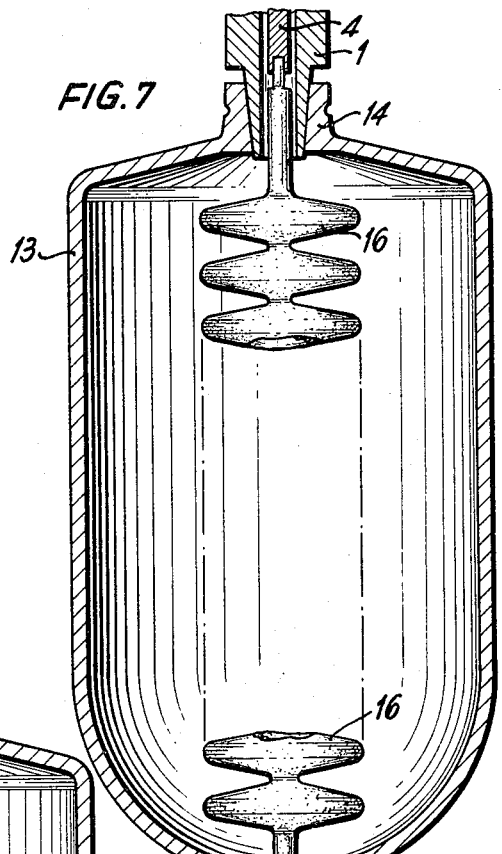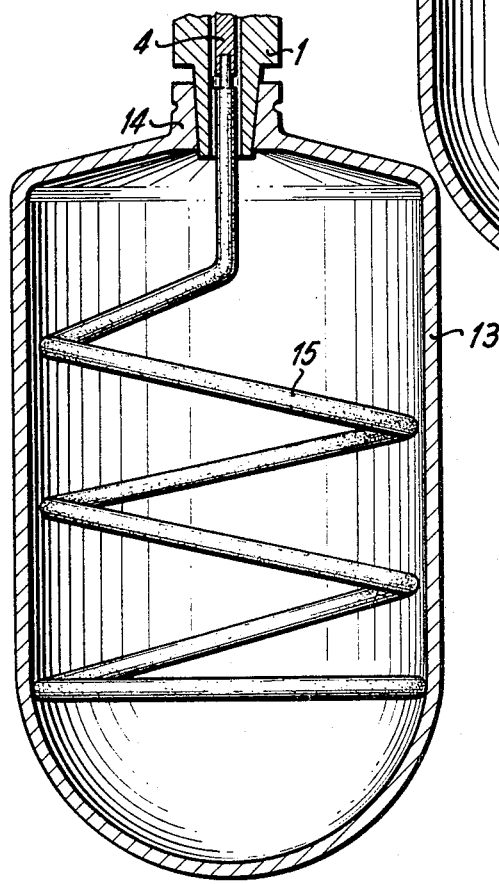

United States Patent Office 3,397,577
Patented Aug. 20, 1968

3,397,577
APPARATUS FOR INDICATING THE FILLED
STATE IN LIQUID GAS CYLINDERS
Hans Siebert, 1 Siebertweg, Kassel-
Wilhelmshoehe, Germany
Filed Sept. 8, 1965, Ser. No. 485,789
Claims priority, application Germany, Dec. 23, 1964,
S 94,803
9 Claims. (Cl. 73—309)

ABSTRACT OF THE DISCLOSURE

A liquid level indicating device having a resilient and elongated float member supported at the bottom of a container and adapted to rise and descend a predetermined distance under the influence of level changes, the indicating rod portion of the float arranged in the upper portion of the container.

The present invention concerns a valve for a liquid gas cylinder having a device for indicating the filled state of the cylinder, comprising a float accommodated within the cylinder which is connected to an indicating device.

Devices are known for indicating the impending emptying of liquid gas cylinders which are actuated from a secondary gas flow supplied through a funnel. This only gives a warning of a drop below a certain liquid level and then only during extraction of the gas. A simple float may also be used, but this demands a large, light and sensitive float, a difficult requirement seeing that the opening in the cylinder neck is small and the specific gravity of the liquid is low. Such a float device is unsuitable for a continuous indication over the whole filling height, since the long float path would have to be reduced to a short indicating path, there being little or no space for including such a mechanism.

The object of the invention is the production of indicating means in which the movement of the indicating device is limited to a minimum, so that the exterior devices above the liquid gas cylinder are kept as small as possible.

According to the present invention a valve for a liquid gas cylinder having a device indicating the state of fill of the cylinder, comprising a float accommodated within the cylinder and connected to an indicating device, in which the float is spring-relieved and has a specific gravity greater than the liquid gas in the cylinder, the spring characteristics being so dimensioned that long distance between the lowest and highest liquid levels in the cylinder is directly reduced to a short travel of a setting part of the indicating device.

This arrangement, without incorporation of any further reduction devices, results in the setting part movement being less than the travel of the whole distance of the liquid level in the liquid gas cylinder, and this travel can be reduced by a large ratio. It is therefore only necessary to provide a short housing for the indicating device, which reduces and simplifies the valve device.

In accordance with one feature of the invention, the float suspension is further substantially simplified, any additional springs for relieving the float being eliminated. It is intended also to exclude the difficulties of introduction of such a spring through the narrow neck of the cylinder. This is achieved by the fact that the float itself is resilient. Thus the float itself produces the necessary compensation of the float weight or the necessary spring relief, introduced to reduce the indicating path of the indicator device. It has furthermore been established that a substantially shorter setting and measuring time can be obtained with the present device. Such a device may also be employed for other similar purposes of filling-state indication.

The self-sprung float preferably comprises a spirally bent tubular hollow member closed at both ends, or having elastic concertina walls. The float spiral or the elastic concertina walls are readily inserted through the narrow neck of the liquid gas cylinder, the float spiral being threaded in the manner of a screwing operation and the float concertina walls inserted by pulling them out to full length and inserting them in this state in the cylinder.

Resilient hollow float members adapted in this manner may advantageously be filled with an inert gas which is lighter than air. This permits the required buoyancy to be obtained.

In accordance with a further feature of the invention the indicating device has a magnet which is connected to the float rod and adapted to be axially displaced in a housing of non-magnetizable material and which magnetically engages an indicating ring arranged concentrically on the outside of the housing and which is protected by means of a transparent guard tube. Due to this construction of the indicating device and with the assistance of the effect of the float, the friction of the moving parts of the indicating device is extremely slight. This is of particular advantage because the adjusting forces are small due to the small cross-section of the float, demanded by the narrow neck of the cylinder, and owing to the low specific gravity of the liquid. An indicating device in accordance with the invention requires little space, and ducts for the indication, and transparent parts subjected to gas pressure are avoided. The outflowing gas does not influence the indication.

The invention will be described further, by way of example, with reference to the accompanying drawings, in which:

FIG. 3 is a schematic view of a second embodiment of the invention;

FIGS. 4 and 5 show axial section and plan views of this embodiment;

FIG. 6 shows a spiral-shaped hollow float member;

FIG. 7 shows a hollow float member with concertina walls.

In all the illustrated embodiments of the invention the float is spring-relieved and of greater specific gravity than the liquid gas in the cylinder. By this it is achieved that the movement of the setting parts of the indicating device in relation to the liquid level change.

Figure 1:
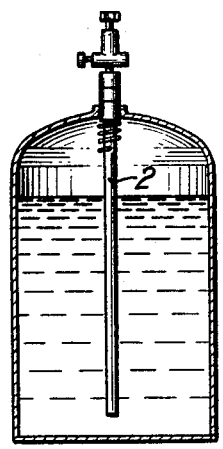
FIG. 1 is an axial section through a schematically illustrated overall arrangement of a first embodiment.
Figure 2:
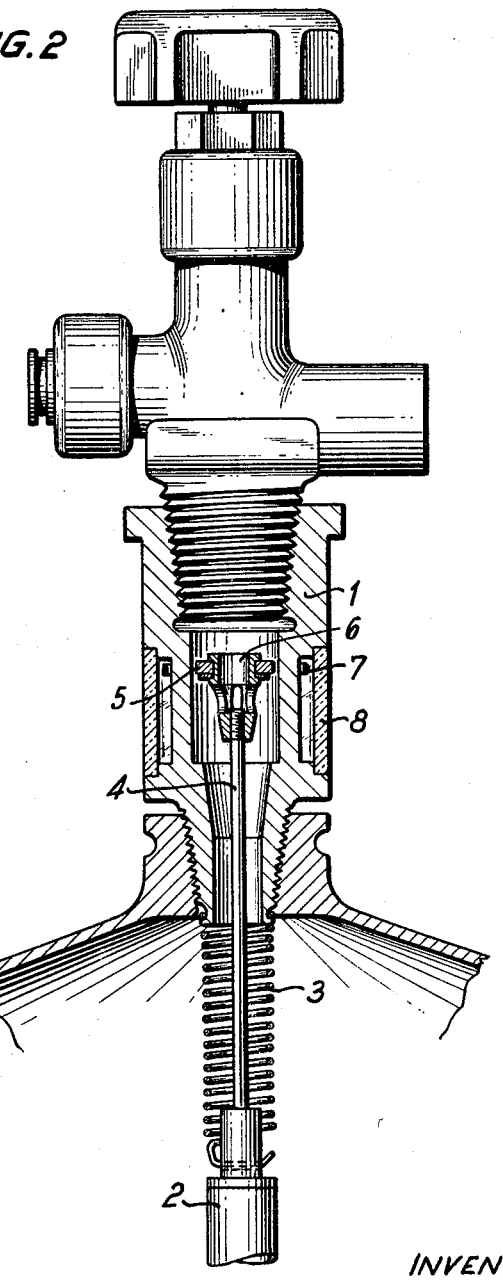
FIG. 2 is an axial section, on a larger scale than that of FIG. 1 through the valve arrangement showing the indicating device and the parts of the float suspension.

In the arrangement according to FIGS. 1 and 2 a housing 1, composed of a non-magnetizable material, e.g. brass, is screwed in between a cylinder and a valve. A tubular float 2 of specific gravity greater than the cylinder contents is suspended from the housing by means of a helical spring 3 used in an extended condition. Since the housing is at least in part located in the cylinder it does not occupy any additional space and the housing 1 may be made of a required low overall height. The rod 4 secured to the float supports on its upper end a diametrically magnetized ring magnet 5. A coupling part 6 interconnects the two parts and permits the free passage of liquid or gas, so that the indication is not noticeably affected by gas extraction. An indicating ring 7 of steel sheet comprises two shell halves which are joined together to form a ring by means of a clearly visible red adhesive strip. The indicating space is enclosed by a transparent safety tube 8 which prevents contamination and damaging of the indicating ring. On the inside, the tube is provided with scale markings which facilitate reading the filling state of the cylinder. The spring is so dimensioned that the float, when the cylinder is empty, assumes its lowermost position, whilst with the cylinder full, it is raised into its uppermost position, the total float movement being less than the change in level of the liquid gas. Thus, it is possible for all intermediate values of cylinder fill to be read. The rod 4 passes with considerable clearance through an opening in the housing 1, so that even with the cylinder in an inclined position, the float is still free to move since no contact occurs between rod and housing, which otherwise would result in a substantially increased friction with corresponding reduction of the indicating accuracy.

FIGS. 3 to 5 show a float embodiment wherein the indication is more sensitive near the discharged condition of the cylinder than in the remaining region. This is of special use when relatively long cylinders are concerned, without the indicating movement having to be too greatly reduced. For this purpose a tubular float carrier 11 is used which corresponds to the rod 2 of FIG. 1 but which, by means of additional floats 12, is caused to have a higher buoyancy value in the lower levels of the liquified gas contents.

The additional floats 12 are so connected to the float carrier by means of wires that as shown in FIG. 3 they may be individually inserted through the cylinder opening. Then the float carrier 11 is introduced and the additional floats drawn up by means of the wires until, as evident from FIGS. 4 and 5, they are closely held against the float carrier. The wires are then secured outside the cylinder—e.g. by being twisted together. In this way it is possible for several additional floats to be connected to the centrally arranged float carrier. Otherwise the embodiment of FIGS. 3–5 correspond to that of FIGS. 1 and 2.

The ring magnet may also be replaced by a disc-shaped magnet, to which the rod 4 is connected directly without an intermediate adapter. In this case recesses are formed on the circumference of the magnet through which the gas may flow freely. The magnet may either be diametrically or axially magnetized. "Diametrically magnetized" means that the magnetization has been effected at right angles to the ring axis. For example, a north pole is formed at one place on the outside of the ring and diametrically opposite there is a south pole. It is, however, also possible for more than one pair of poles to be formed on the circumference. With diametrical magnetizing the indicating ring comprises two half-rings of soft iron, which are held together by means of an adhesive strip. Such a construction gives a high flux of between magnets and ring and thus gives an accurate "follow" of the ring.

"Axially magnetized" signifies the magnetisation is effected in the direction of the ring axis. One pole is located on the ring surface and the opposite pole on the underside of the ring. With this magnetisation it is expedient to form the indicating ring from three or more ring sections, e.g. by means of adhesive tape, to form a flexible ring left open at one point. This division eliminates tilting of the indicating ring for the following reason: a closed ring adjusts itself so that the reluctance of the magnetic circiut formed by magnet and ring, including the air gaps, is as low as posible. That would be the case when a closed ring assumed a vertical position, i.e. the ring plane would coincide with one of the planes of the lines of magnetic force. This possibility is avoided by dividing the ring into individual ring sections.

In FIGS. 6 and 7 two further simple embodiments of a spring-relieved float are illustrated which do not, however, utilize the separate spring 3 shown in the preceding embodiments. The liquid gas cylinder 13 is provided at its neck 14 with an indicating device with which the rod 4 cooperates in the manner shown in FIG. 2. The indicating device is therefore not separately shown in FIGS. 6 and 7. As shown in FIG. 6, a float located in the liquid gas cylinder 13 is formed as a resilient hollow spirally bent tube 15 which is closed at both ends and connected to the rod 4. The outer diameter of the float spiral 15, which in the example is cylindrical, is slightly less than the inner diameter of the liquid gas cylinder, so that the float spiral 15 is mounted substantially concentrically in the cylinder. This provides protection against damage. The float spiral 15 rests on part of the curved bottom of the liquid gas cylinder 13, so that its buoyancy is increased by this support.

The float spiral 15 may also be of conical shape. In this case it is expedient for the outer diameter of the largest of the coils of the spiral to be slightly less than the inner diameter of the liquid gas cylinder.

As shown by FIG. 7 which otherwise corresponds to FIG. 6, a resilient float has concertina shaped walls 16 and also rests on the bottom of the liquid gas cylinder. The concertina walls are inserted in an extended state through the narrow neck 14 into the liquid gas cylinder 13 and replace the tube 15 of FIG. 6.

The resilient hollow float bodies 15 and 16 may be filled with an inert gas which is lighter than air. The said bodies are preferably made of a resilient plastics material.

I claim:

1. A device for indicating the liquid level in a vessel, comprising indicating means supported by said vessel and being moveable between first and second end positions which respectively correspond to the highest and the lowest level of liquid in said vessel; an elongated float member supported at its lower end by said vessel and resilient in longitudinal direction, said float member extending in said vessel in vertical direction with its upper end connected to said indicating means so that, in the absence of liquid, said float member is resiliently compressed by its weight in downward direction, thus having the tendency to expand in upward direction whereby, when liquid is present in said vessel, said float member will resiliently expand in upward direction so that the upper end of said float member rises and descends during rising and descending, respectively, of the level of liquid in said vessel by a distance which is proportional to but smaller than the fluctuations of the level of such liquid, such smaller movements of said upper end of said float member being transmitted to said indicating means.

2. A device as defined in claim 1, wherein said float member is a buoyant member.

3. A device as defined in claim 1, wherein said float member is a closed hollow body of resilient material.

4. A device as defined in claim 3, wherein said hollow body is a closed bellows.

5. A device as defined in claim 3, wherein said float member is a helically convoluted tube.

6. A device as defined in claim 5, wherein the maximum outer diameter of the helix defined by said helically convoluted tube substantially approaches the inner diameter of said vessel.

7. A device as defined in claim 6, wherein said helix is of substantially cylindrical configuration.

8. A device as defined in claim 6, wherein said helix is of substantially conical configuration.

9. A device as defined in claim 1, wherein said float member is a closed hollow body filled with gaseous fluid which is lighter than air.

References Cited

UNITED STATES PATENTS

| | | | |
|---|---|---|---|
| 42,384 | 4/1864 | Lee | 73—311 |
| 1,532,291 | 4/1925 | Woolson | 73—322.5 X |
| 2,634,608 | 4/1953 | Sorber. | |
| 3,133,441 | 5/1964 | Conkling | 73—322.5 X |

DAVID SCHONBERG, *Primary Examiner.*

DANIEL M. YASICH, *Assistant Examiner.*